United States Patent [19]
Wimbush

[11] Patent Number: 4,756,160
[45] Date of Patent: Jul. 12, 1988

[54] HYDRAULIC MASTER CYLINDER

[75] Inventor: Maurice J. Wimbush, Leamington Spa, England

[73] Assignee: Automotive Products plc, Leamington Spa, England

[21] Appl. No.: 932,009

[22] Filed: Nov. 18, 1986

[30] Foreign Application Priority Data

Nov. 26, 1985 [GB] United Kingdom ............... 8529104

[51] Int. Cl.[4] .................................... B60T 11/28
[52] U.S. Cl. ........................... 60/589; 91/422; 92/248
[58] Field of Search ................. 60/589, 594, 533; 91/422; 92/248; 251/368

[56] References Cited

U.S. PATENT DOCUMENTS

| | | | |
|---|---|---|---|
| 4,121,421 | 10/1978 | Myers | 60/582 |
| 4,267,697 | 5/1981 | Hodkinson | 60/589 |
| 4,330,995 | 5/1982 | Miyakawa | 60/589 |

FOREIGN PATENT DOCUMENTS 3116584 11/1982 Fed. Rep. of Germany ........ 60/589

Primary Examiner—Abraham Hershkovitz
Attorney, Agent, or Firm—Solon B. Kemon

[57] ABSTRACT

A hydraulic master cylinder has a piston of cylindrical section slidably sealed within the cylinder bore. An insert is mounted on the piston and defines an axial groove for engagement of an abutment projecting laterally into the cylinder bore, and a transverse slot for retention of a lever which is adapted to engage the abutment to control the opening and closing of a breather valve.

2 Claims, 2 Drawing Sheets

HYDRAULIC MASTER CYLINDER

BACKGROUND TO THE INVENTION

This invention relates to hydraulic master cylinder assemblies used for, but not exclusively for, the braking and clutch systems of automobiles.

In a typical braking system, the hydraulic fluid housed in the reservoir of a master cylinder, is fed into the braking system to replenish fluid lost due to leaks, or to top up the system as it expands due to for example, wear on brake linings in the case of a braking system. The feeding of fluid into the high pressure side of the master cylinder actuating piston, when the piston is at the brake release position is called "breathing" and typically involves a one way valve mechanism, so that fluid can feed freely from the reservoir into the braking system when the brakes are fully released, but fluid is not displaced into the reservoir when the brakes are applied.

It has been propsed in European Patent Publication No. 0008863, to provide a hydraulic master cylinder with a one piece piston, said piston having a breather valve operated by a pivotted lever mounted on the piston and an abutment associated with the cylinder. The pivotted lever is mounted in a wedge shaped slot in the piston and forms a stop for an axial on the breather valve, so that when the piston is in its fully retracted position and the lever abuts the abutment associated with the cylinder, the breather valve will be held open, but when the piston moves upon actuation of the master cylinder, movement of the lever will allow the breather valve to close.

This arrangement provides a method of operating a "breathing" means for a one piece piston by use of a relatively short abutment. An advantage of this construction is that a very deep co-axial blind bore can be made in the piston to provide lateral support for the input rod which will reduce the likelihood of the piston tending to tilt during application of the braking load.

With the construction disclosed in the European Patent Publication No. 0008863, the piston comprises a spool having two axially separated cylindrical portions each of which seals against the wall of the cylinder and an intermediate portion of cruciform section in which are formed an axial groove which co-operates with the abutment associated with the cylinder to guide the piston in the cylinder and a wedge shaped slot to accommodate the lever. Because of its complex shape, the piston is difficult and expensive to manufacture.

The present invention is a modification to the hydraulic master cylinder disclosed in European Patent Publication No. 0008863 in which the construction of the piston is simplified.

SUMMARY OF THE INVENTION

According to one aspect of the present invention a hydraulic master cylinder includes, a piston with a blind bore for receiving an input rod, the piston having a breather valve therein provided with opening means operated by an abutment projecting laterally into the master cylinder bore and which is received into an axial groove in the piston, a lever pivotally mounted in a slot in the piston, said lever extending transversely of the piston and engageable with the abutment to operate the breather valve, said piston being of cylindrical section and having mounted thereon, an insert which defines the said axial groove and slot and locates the lever.

BRIEF DESCRIPTION OF THE DRAWINGS

An embodiment of the invention is now described, by way of example only, with reference to the accompanying drawings in which.

DESCRIPTION OF A PREFERRED EMBODIMENT

Figure 1:
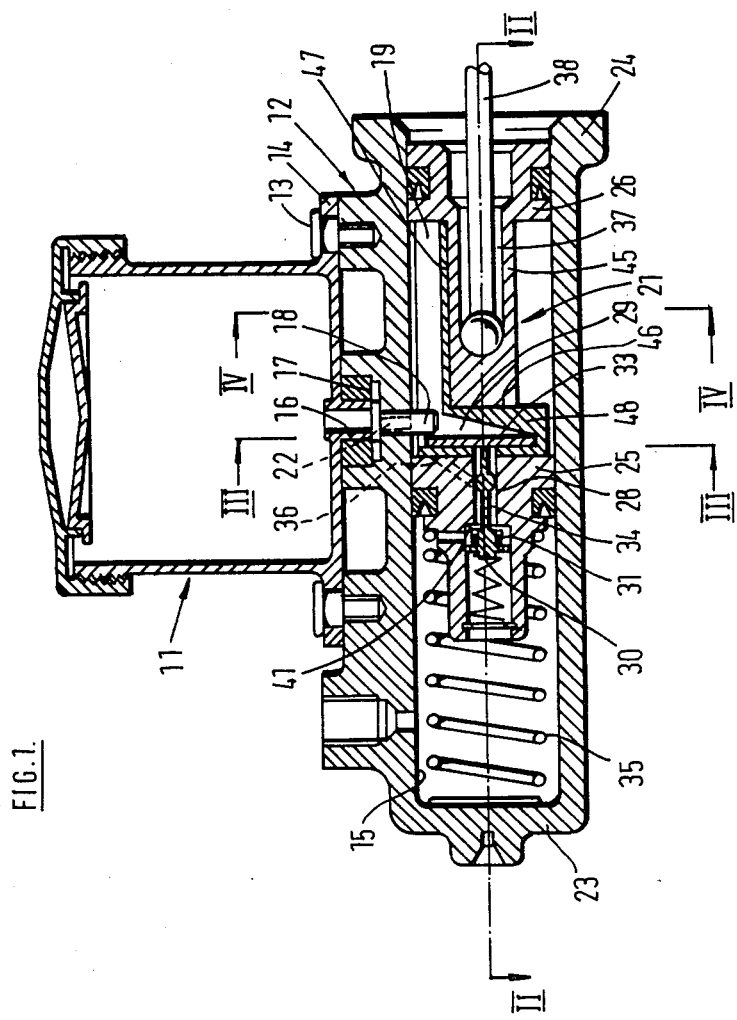
FIG. 1 is a longitudinal section through a master cylinder assembly formed in accordance with the present invention.
Figure 2:
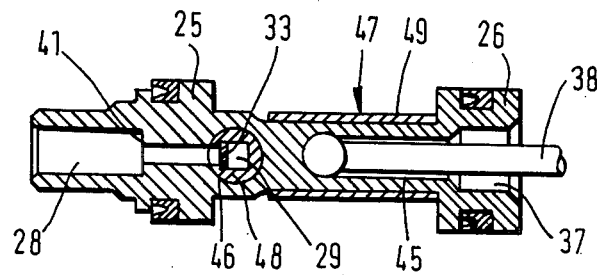
FIG. 2 is a section of the piston assembly used in the assembly illustrated in FIG. 1, along the line II—II.
Figures 3, 4:
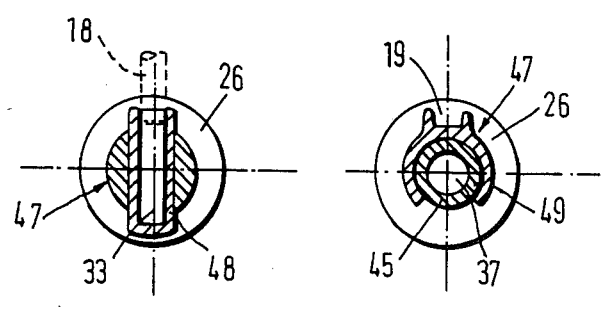
FIG. 3 is a section of the piston assembly used in the assembly illustrated in FIG. 1, along the line III—III.
FIG. 4 is a section of the piston assembly used in the assembly illustrated in FIG. 1, along the line IV—IV.

The hydraulic master cylinder assembly shown in FIGS. 1 to 4 comprises a polypropylene hydraulic reservoir 11 secured to the master cylinder body 12 by screws 13 which pass through lugs in the reservoir 11. The fluid connection between the reservoir 11 and master cylinder bore 15 is provided by a hollow spigot 16 in the base of the reservoir 11 which is sealingly connected with cylindrical recess 17 in the external surface of the master cylinder body 12. A solid pin 18 having its head in recess 17 extends radially through the wall of the master cylinder into the bore 15. A passageway 22 provides a fluid flow path between the recess 17 and the bore 15 and is substantially parallel with the pin 18.

The master cylinder bore 15 is a blind bore having an end wall 23 and a mouth 24. A piston 21 is located within the bore 15 of the master cylinder. The piston 21 has a pair of cylindrical portions 25 and 26, each of which seals against the wall of the bore 15 and which are joined by a reduced diameter co-axial cylindrical intermediate portion 45. The cylindrical portion 25 which lies adjacent to the closed end 23 of bore 15, has an axially stepped bore 28 therein, its larger diameter end portion opening towards the end of the piston 21 adjacent the closed end 23 of bore 15.

The small diameter end of bore 28 opens into a transverse bore 46 in the intermediate portion 45 of the piston 21. A plastic insert 47, has as plug formation 48 which locates within the bore 46 in piston 21 and a clip formation 49 which engages around, in excess of 180 degrees, the intermediate portion 45 of piston 21. The insert 47 defines an axial groove 19 into which locates the pin 18. A wedge shaped diametral slot 29 is provided in the plug formation 48, the wall of the slot 29 adjacent cylindrical portion 25 being vertical and the opposite wall thereof being inclined, the wider end of the wedge shaped slot 29 opening into axial groove 19.

The smaller diameter end of bore 28 is extended through the plug formation 48 of insert 47 into the slot 29.

The axial stepped bore 28 of piston 21 has a breather valve constituted by a one way valve 30 located therein. The valve 30 is spring loaded towards the shoulder 41 of the stepped bore 28 and has an annular seal 31 for sealing against said shoulder 41. An axial stem 34 projects from the valve 30 through the smaller diameter portion of stepped bore 28 and into the slot 29.

A lever 33 is a close fit in the slot 29 so the lever can move axially but not transversely relative to the master cylinder. One end of the lever 33 fits into the apex of the wedge shaped slot 29, so that the lever pivots about said one end and the other end of the lever is free to move axially at the wider end of the slot, thus the lever 33 can rock about its one end. Lever 33 is of such length that it overlaps with the pin 18 located in the axial groove 19, the lever being located on the side of pin 18 adjacent to the closed end 23 of bore 15.

The lever 33 will thus abut the end of axial stem 34 on valve 30 and, when the piston 21 is fully released, as indicated in FIG. 1, and lever 33 abuts pin 18 the valve 30 will be held in its open position. When the piston 21 is moved towards the end wall 23 against a spring 35, so as to generate hydraulic pressure, the lever 33 is moved out of abutment with the pin 18 and the spring loaded valve 30 pushes the lever 33 clockwise about its one end, thus seating the seal 31 against the shoulder 41 and closing the bore 28 to fluid flow. When the hydraulic pressure is released, the piston 21 is moved by spring 35 back towards the mouth 24 until lever 33 abuts the pin 18, continued return movement of the piston 21 then causes the lever to pivot anticlockwise thereby causing the one way valve 30 to open and allow fluid to flow through the axial bore 28 thus allowing the hydraulic system to "breath". The return movement continues until the lever 33 abuts the vertical wall of the slot 29 so that the lever 33 is sandwiched between the pin 18 and the plug portion 48 of insert 47, the pin 18 then preventing continued movement of the piston towards the mouth 24. A fluid cross passageway 36 is provided to allow the fluid to pass freely at all times from the open end of slot 29 into the stepped bore 28.

The end portion 26 adjacent the mouth 24 of bore 15 has an axial input bore 37 into which an input rod 38 is fitted. The bore 37 extends into the intermediate cylindrical portion 45 and axially overlaps the slot 19. The bore 37 is a blind bore of sufficient axial depth when compared with its diameters to provide some lateral support for the input rod 38 prevent appreciably the rod having a large degree of lateral movement. The bore 37 is also of sufficient depth that the rod 38 will not become disengaged from the bore due to different relative return rates when the rod is withdrawn. Also by having a deep input bore 37 the end of which is at least half the length of the piston 21, the tendency of the piston 21 to tilt on application of the brake input load is reduced.

By using plastic insert to define the axial groove 19 and diametral slot 29 in the manner described above, a piston 21 of relatively simple cylindrical configuration may be used in place of the very complex shape of piston that was required hitherto.

I claim:

1. A hydraulic master cylinder including a piston having a breather valve therein, said piston having a blind bore fore receiving an input rod and also having a pair of cylindrical portions which engage and are sealed to the wall of the master cylinder, said cylindrical portions being separated axially by an intermediate cylindrical portion of reduced diameter, a transverse bore being formed in the intermediate cylindrical portion at the end thereof adjacent to the leading end of the piston; an insert having a plug formation which locates in the transverse bore and defines a slot, and a body portion with a clip formation which engages about the intermediate cylindrical portion and defines an axial groove; a lever pivotally mounted in the slot; and abutment means projecting laterally into said groove for engagement of said lever to operate said breather valve.

2. An hydraulic master cylinder according to claim 1 in which the clip formation comprises an axially split tubular formation which engages around, in excess of 180 degrees, of a cylindrical portion of a piston.

* * * * *